United States Patent [19]
Rush

[11] Patent Number: 5,377,775
[45] Date of Patent: Jan. 3, 1995

[54] HOVERCRAFT MOTORCYCLE

[76] Inventor: Joseph Rush, 275 R63 Hwy., Lot 8, Norwalk, Iowa 50211

[21] Appl. No.: 179,068

[22] Filed: Jan. 10, 1994

[51] Int. Cl.⁶ .................................................. B60V 3/02
[52] U.S. Cl. .................................... 180/116; 180/121; 180/127; 180/219
[58] Field of Search ............... 180/116, 117, 121, 127, 180/219

[56] References Cited

U.S. PATENT DOCUMENTS

| | | |
|---|---|---|
| D. 183,816 | 10/1958 | Simmons . |
| 3,263,764 | 8/1966 | Bertin .................................. 180/219 |
| 3,575,251 | 4/1971 | Moore .................................. 180/219 |
| 3,884,521 | 5/1975 | Moore . |
| 4,068,810 | 1/1978 | Malewicki . |

FOREIGN PATENT DOCUMENTS

| | | | |
|---|---|---|---|
| 3412008 | 10/1985 | Germany ............................. | 180/117 |
| 6804332 | 9/1969 | Netherlands ........................ | 180/116 |
| 90/03293 | 4/1990 | WIPO .................................. | 180/116 |

*Primary Examiner*—Mitchell J. Hill
*Attorney, Agent, or Firm*—Rhodes & Ascolillo

[57] ABSTRACT

In a preferred embodiment, a hovercraft motorcycle for travel over a ground surface, comprising: a body portion having a front end, a rear end, a longitudinal centerline extending from the rear end to the front end, and a lower surface spaced above the ground surface; a generally horizontal, continuous, inflatable, resilient tubular member attached to, disposed around, and depending from the lower surface of the body portion having an air inlet port; the generally horizontal, continuous, inflatable, resilient tubular member having an air inlet port; an air plenum chamber defined between the tubular member, the lower surface of the body portion, and the ground surface; an apparatus to supply pressurized air to the air plenum chamber; a front wheel assembly, attached to the front end of the body portion and on the longitudinal centerline of the body portion, having a front wheel mounted thereon; and a rear wheel assembly, attached to the rear end of the body portion and on the longitudinal centerline of the body portion, having a rear wheel mounted thereon.

3 Claims, 4 Drawing Sheets

HOVERCRAFT MOTORCYCLE

BACKGROUND OF THE INVENTION

1. Field of the Invention

The present invention relates to vehicles generally and, more particularly, but not by way of limitation, to a novel vehicle comprising a combination hovercraft and motorcycle.

2. Background Art

Hovercraft of various types have been developed to travel over water and/or land. Hovercraft typically feature one or more downwardly open air chambers supplied with pressurized air which lifts the hovercraft slightly off the ground or water such that the hovercraft rides on a cushion of air. Propulsion may be supplied by various means. A major advantage of hovercraft is that they offer a smooth ride over relatively rough water or terrain. A disadvantage is that they are frequently difficult to control and to stop. A motorcycle, on the other hand, is readily controlled and stopped; however, the motorcycle does not offer a smooth ride on rough terrain and, of course, is unsuitable for water travel.

Some known vehicles of interest are described in the following patent documents:

U.S. Pat. No. Des. 183,816, issued Oct. 28, 1958, to Simmons, describes a flying auto which appears to have large, ducted fans or propellers to lift the auto off the ground.

U.S. Pat. No. 3,263,764, issued Aug. 2, 1966, to Bertin, describes a ground-effect hovering platform having at least three plenum chambers bounded by flexible vertical skirts underneath the platform. The plenum chambers are individually provided with compressed air, the air flow to each plenum chamber being separately controlled. A horizontal component of motion may be imparted to the platform by means of having the skirt structures gimballed so that one or more may be tilted slightly to one side or the other of the platform. Wheels are provided fore and aft on the centerline of the platform, with the rear wheel being driven by a motor and the front wheel being steerable. The hovering platform is quite complex and it appears that, when air to the chambers is cut off, the platform would have to rest directly on the lower edges of the gimballed skirt structures, possibly causing damage thereto.

U.S. Pat. No. 3,884,521, issued May 20, 1975, to Moore, describes a lightweight vehicle which has a framework which includes therein closed bottle-like spaces which may contain helium.

U.S. Pat. No. 4,068,810, issued Jan. 17, 1978, to Malewicki, describes a combination motorcycle and hangglider which is intended to fly well above the earth's surface.

SUMMARY OF THE INVENTION

None of the above inventions provides a simple, easily constructed, combination hovercraft and motorcycle.

Accordingly, it is a principal object of the present invention to provide a combination hovercraft and motorcycle that is simple and easily constructed.

It is a further object of the invention to provide such a combination hovercraft and motorcycle that provides cushioning for the body of the hovercraft motorcycle when not in use.

Other objects of the present invention, as well as particular features, elements, and advantages thereof, will be elucidated in, or be apparent from, the following description and the accompanying drawing figures.

The present invention achieves the above objects, among others, by providing in a preferred embodiment, a hovercraft motorcycle for travel over a ground surface, comprising: a body portion having a front end, a rear end, a longitudinal centerline extending from the rear end to the front end, and a lower surface spaced above the ground surface; a generally horizontal, continuous, inflatable, resilient tubular member attached to, disposed around, and depending from the lower surface of the body portion having an air inlet port; the generally horizontal, continuous, inflatable, resilient tubular member having an air inlet port; an air plenum chamber defined between the tubular member, the lower surface of the body portion, and the ground surface; means to supply pressurized air to the air plenum chamber; a front wheel assembly, attached to the front end of the body portion and on the longitudinal centerline of the body portion, having a front wheel mounted thereon; and a rear wheel assembly, attached to the rear end of the body portion and on the longitudinal centerline of the body portion, having a rear wheel mounted thereon.

The front wheel assembly further comprises a steerable front wheel assembly which is orientable to provide directional steering for the hovercraft motorcycle.

The rear assembly further comprises: an electric motor mounted on the rear wheel assembly to provide motive power for the hovercraft; a transmission mounted on the rear wheel assembly, the transmission connecting the electric motor and the rear wheel; and a generator mounted in the body portion and connected to the electric motor for supplying electrical power to the electrical motor.

The means to supply pressurized air to the air plenum chamber comprises: a shrouded opening formed in the body portion and a lift fan mounted in the shrouded opening to force air downwardly into the air plenum chamber to pressurize the air plenum chamber and cause the body portion along with the tubular member attached thereto to rise above the ground surface such that a lower edge of the tubular member is slightly above the ground surface. The lift fan has a discharge side facing vertically downward into the air plenum chamber and an intake side facing vertically upward opposite to the discharge side. The lift fan is preferably gasoline-powered.

The hovercraft motorcycle further comprises: an inlet air passage to the tubular member, and an air diverter, forming part of the inlet air passage to the tubular member. The air diverter has a proximal end disposed substantially near the air inlet port of the tubular member, and a distal end disposed substantially near the discharge side of the lift fan so as to direct a portion of the air discharge into the tubular structure so as to inflate the tubular member. Preferably, the air diverter is arranged such that approximately 20 percent of the lift fan capacity is directed to the tubular member.

The hovercraft motorcycle additionally comprises a first adjustable ballast weight attached to the front wheel assembly, and a second adjustable ballast weight attached to the rear wheel assembly, the first and second adjustable ballast weights to ensure that the front and rear wheel assemblies carry only enough weight of the hovercraft motorcycle to provide sufficient friction between the front and rear wheel assemblies and the ground surface for traction and steering purposes.

The tubular member and the body portion are preferably arranged such that when the hovercraft motorcycle is not in operation, with the air plenum chamber at atmospheric pressure and with the tubular member deflated, the body portion will rest in cushioned manner on collapsed the tubular member and not in contact with the ground surface.

The hovercraft motorcycle further comprises a power circuit. The power circuit includes: a transformer, for reducing the voltage output of the generator, in the circuit; a full wave rectifier, for converting AC output of the transformer to DC output, in the circuit; a volt meter, for monitoring output voltage of the rectifier, in the circuit; an ampere meter, for monitoring output current of the rectifier, in the circuit; a main controller, for controlling the level of electric current delivered to the electric motor, in the circuit; a hand controller, to allow manual input selection of electric current delivered to the electric motor, in the circuit; a master switching relay network, for switching the directional actuation of the electrical motor, in the circuit; control line relays, for sending control signals to the network, in the circuit; a direction switch, to allow manual input for selection of directional actuation of the electric motor, in the circuit; and, a safety knife switch, to allow immediate manual disconnection of power to the electric motor, in the circuit.

BRIEF DESCRIPTION OF THE DRAWINGS

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
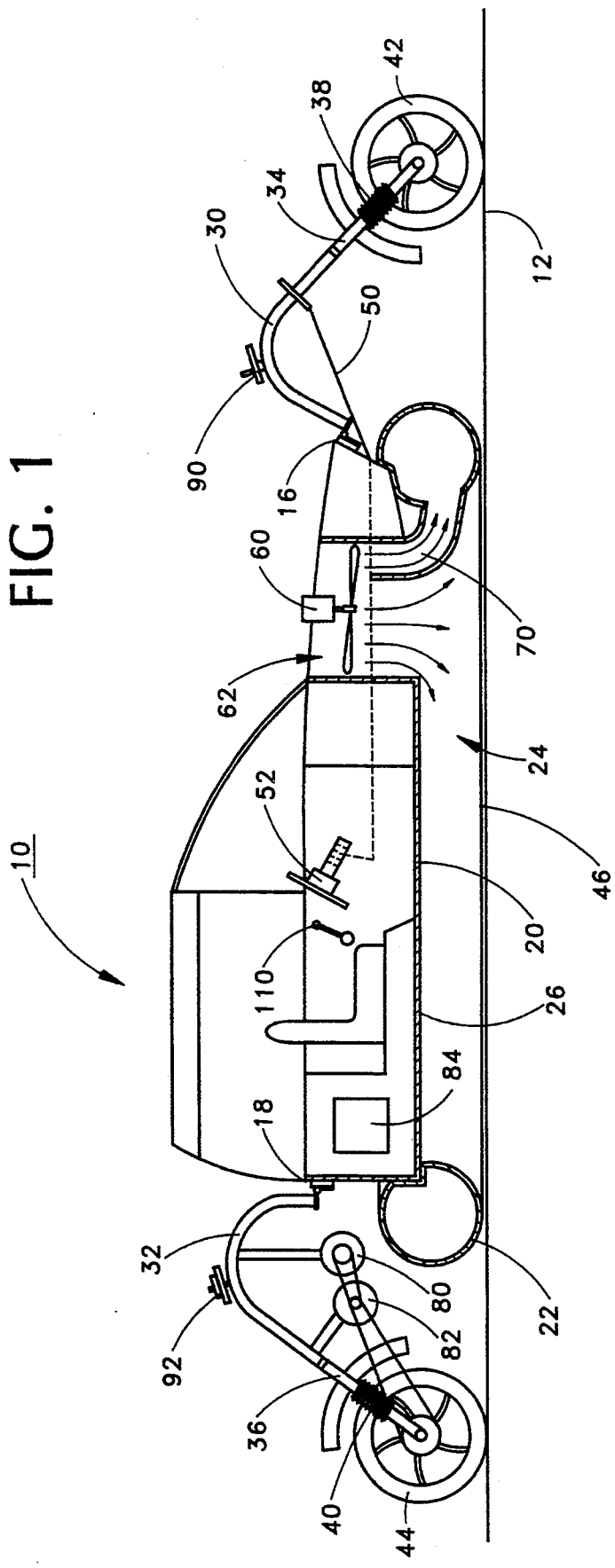
FIG. 1 is side elevational view, partially in cross-section, of a hovercraft motorcycle constructed according to the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

Figure 2:
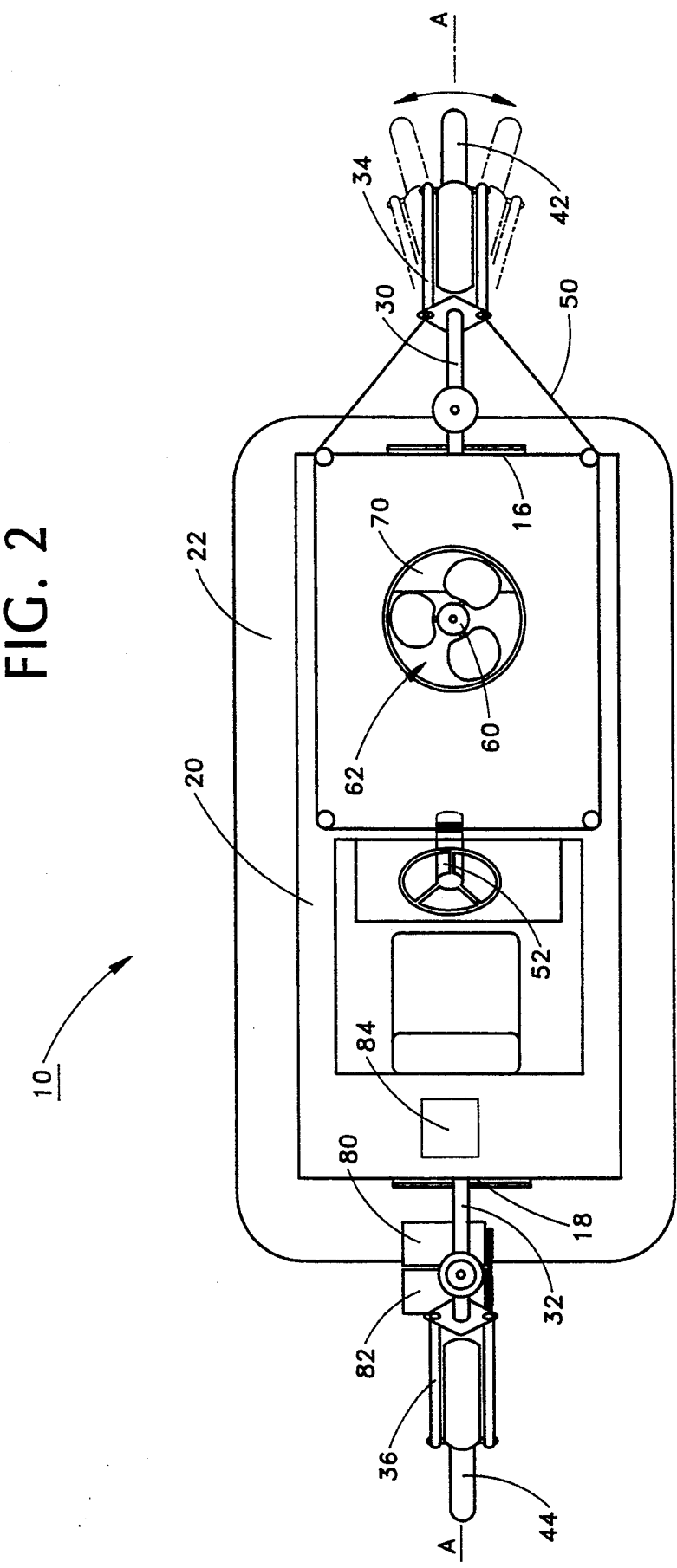
FIG. 2 is a top plan view of the hovercraft motorcycle of FIG. 1.
Figure 3:
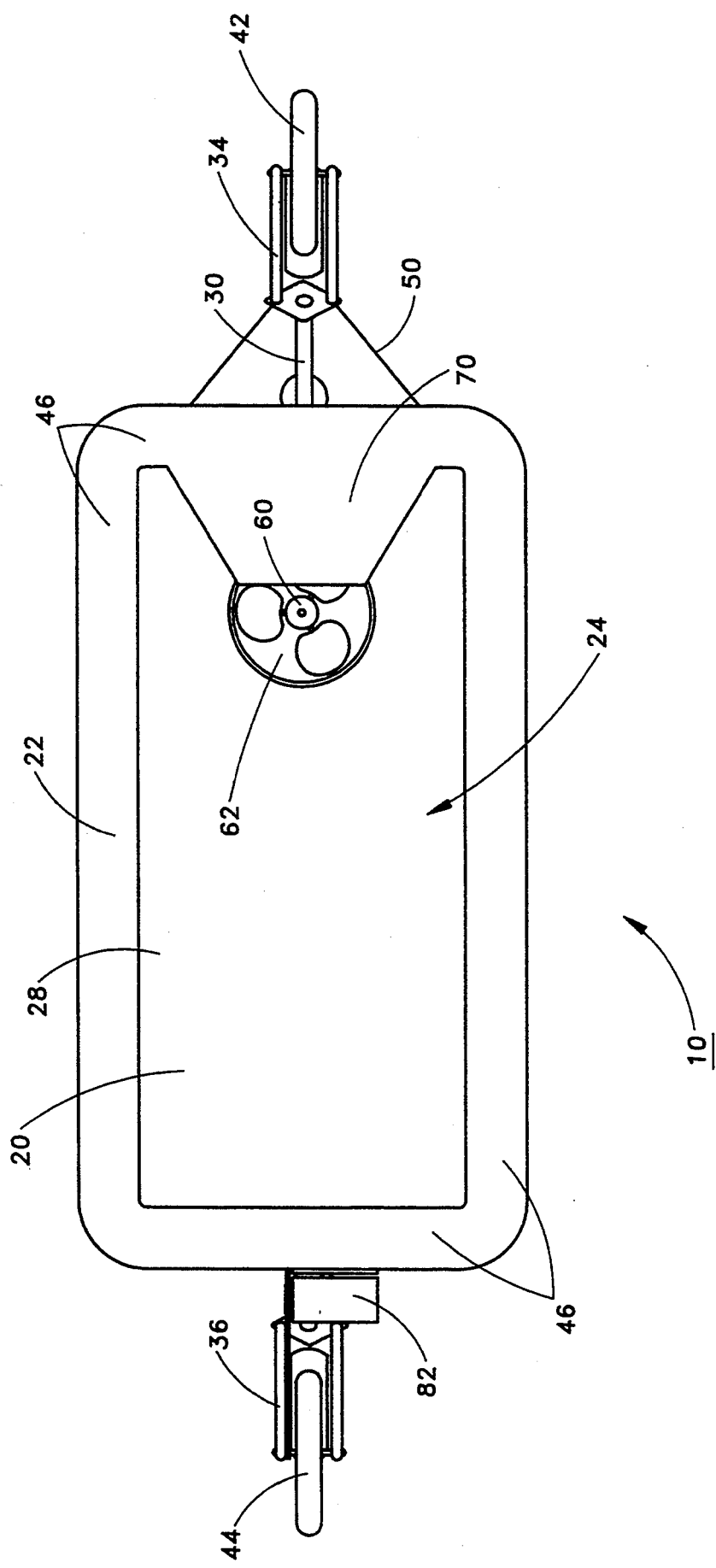
FIG. 3 is a bottom plan view of the hovercraft motorcycle of FIGS. 1 and 2.

Reference should first be made to FIGS. 1-3 together for an understanding of the construction of the hovercraft motorcycle of the present invention, generally indicated by the reference numeral 10, in operation on a ground surface 12 (FIG. 1).

Hovercraft motorcycle 10 includes a body portion 20 having attached around the lower edge 26 thereof, and depending therefrom, a generally horizontal, continuous, circular, resilient tubular member 22, thus creating an air plenum chamber 24 (FIGS. 1 and 2) defined between the lower surface 28 of the body portion, the tubular structure 22, and ground surface 12. Fixedly attached to the front end 16 of hovercraft motorcycle 10 is a forwardly extending first tubular support 30 and fixedly attached to the rear end 18 of the hovercraft motorcycle is a rearwardly extending second tubular support 32 (FIGS. 1 and 2). A front wheel assembly 34 is rotatably attached to first tubular support 30 and a rear wheel assembly 36 is fixedly attached to second tubular support 32. Front wheel assembly 34 and rear wheel assembly 36 are mounted along the longitudinal centerline of body portion 20 which extends from the rear end 18 to the front end 16, as seen by line A—A in FIG. 2. Conventional spring shock absorbers 38 and 40 are provided, respectively, in front and rear wheel assemblies 34 and 36. Front and rear wheels 42 and 44 of front and rear wheel assemblies 34 and 36, respectively, engage surface 12. Front wheel assembly 34 can be rotated for steering purposes, as indicated by the arrow on FIG. 2, by means of a steering cable 50 operatively connected to a steering wheel 52 disposed in body portion 20 (FIGS. 1 and 2).

A gasoline-operated lift fan 60 is mounted in a shrouded opening 62 formed in body portion 20 and forces air downwardly into air plenum chamber 24, as is indicated on FIG. 1. This flow of air pressurizes the air plenum chamber 24, and causes body portion 20 with tubular member 22 attached thereto to rise, such that the lower edge 46 of the tubular member 22, is slightly above surface 12, as is also shown on FIG. 1, in the manner known for hovercraft vehicles. An air diverter 70 (FIG. 1) which forms part of an inlet passage to tubular member 22 has its distal end closely disposed near the discharge side of lift fan 60 and extends partially into the air discharge therefrom to direct a portion of the air into the tubular member 22 so as to inflate the tubular member, as is indicated on FIG. 1. Air diverter 70 is arranged such that approximately 20 percent of the capacity of lift fan 60 is directed to tubular member 22.

Motive power for hovercraft motorcycle 10 is provided to rear wheel 44 from an electric motor 80 through a transmission 82. A generator 84 mounted in body portion 14 supplies electric power to motor 80.

Preferably, front and rear wheel assemblies 34 and 36, respectively, carry only enough of the weight of hovercraft motorcycle 10 to provide sufficient friction with surface 12 for traction and steering purposes. This is set, in part, by adjustable ballast weights 90 and 92 attached, respectively, to front and rear assemblies 34 and 36, the ballast weights also being used to compensate for different weights of different operators (not shown) of hovercraft motorcycle 10.

A particular advantage of hovercraft motorcycle 10 is that when it is not in operation, that is, when air plenum chamber 24 is at atmospheric pressure and tubular member 22 is deflated, body portion 14 will rest in cushioned manner on the collapsed tubular structure and will not be in contact with surface 12.

Figure 4:
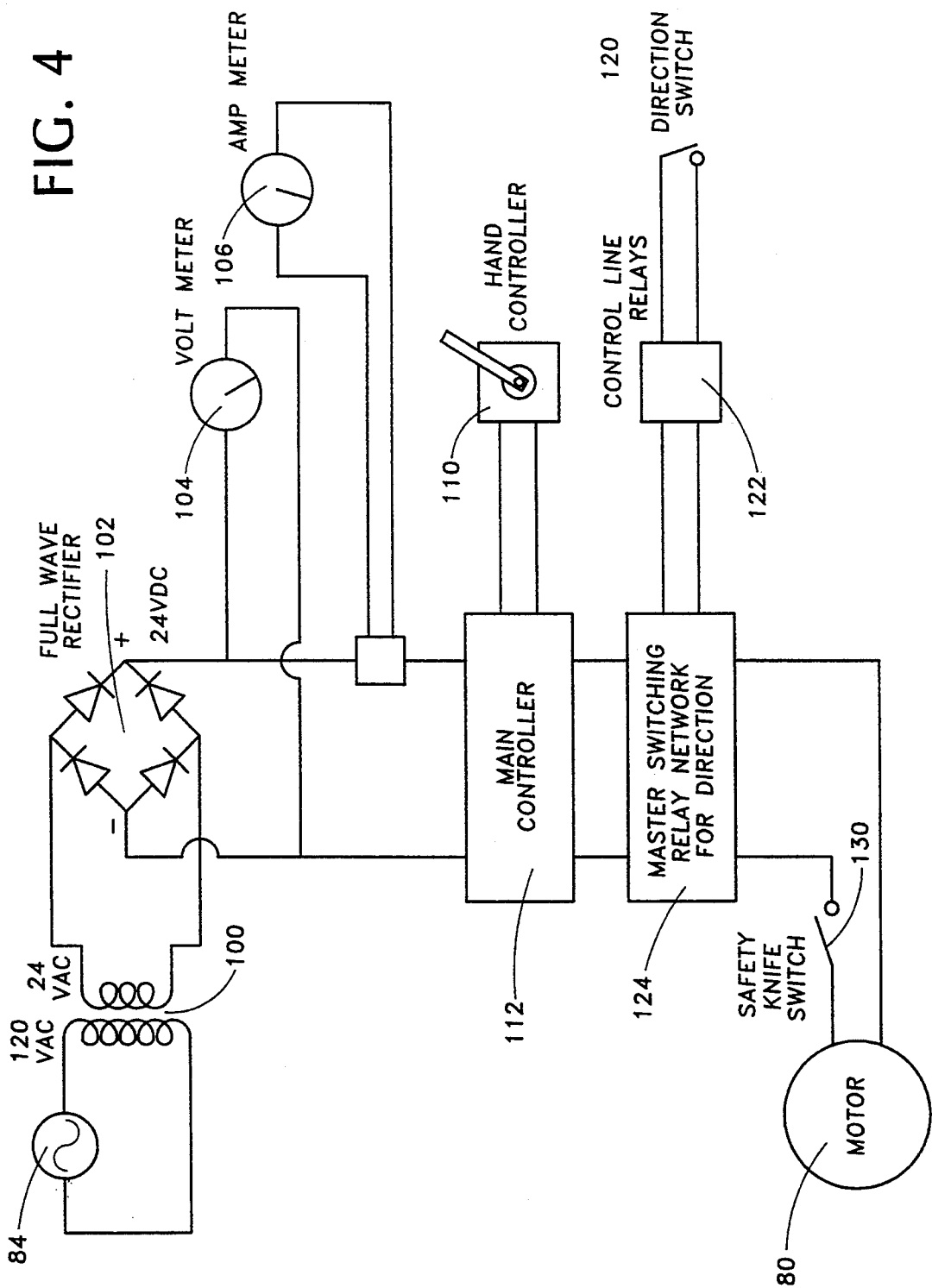
FIG. 4 is a schematic/block diagram showing the electrical components, controls, and circuitry of the hovercraft motorcycle of FIGS. 1-3.

FIG. 4 illustrates control circuitry for use with the electrical components of hovercraft motorcycle 10. Generator 84 outputs 120 VAC power which is dropped to 24 VAC by a transformer 100. The 24 VAC power is converted to 24 VDC power by a full wave rectifier 102. A volt meter 104 and an ampere meter 106 permit the operator of hovercraft motorcycle 10 to monitor the output of rectifier 102. A hand controller 110 (seen also in FIG. 1) is coupled to a main controller 112 which controls the level of electric current to motor 80. A direction switch 120 is coupled to control line relays 122 which control a master switching relay network 124 to determine the direction (forward or reverse) of hovercraft motorcycle 10. A safety knife switch 130 in a power line to motor 80 is provided for immediate disconnection of power to the motor in case of emergency.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A hovercraft motorcycle for travel over a ground surface, comprising:
    a body portion having a front end, a rear end, a longitudinal centerline extending from said rear end to said front end, and a lower surface spaced above the ground surface;
    a generally horizontal, continuous, inflatable, resilient tubular member having an air inlet port;
    an air plenum chamber defined between said tubular member, said lower surface of said body portion, and said ground surface;
    means to supply pressurized air to said air plenum chamber;
    a front wheel assembly, attached to the front end of said body portion and on the longitudinal centerline of the body portion, having a front wheel mounted thereon, said front wheel assembly further comprising a steerable front wheel assembly which is orientable to provide directional steering for said hovercraft motorcycle; and
    a rear wheel assembly, attached to the rear end of said body portion and on the longitudinal centerline of the body portion, having a rear wheel mounted thereon, said rear assembly further comprising:
        an electric motor mounted on said rear wheel assembly to provide motive power for said hovercraft;
        a transmission mounted on said rear wheel assembly;
        said transmission connecting said motor and said rear wheel; and
        a generator mounted in said body portion and connected to said electric motor for supplying electrical power.

2. A hovercraft motorcycle, as defined in claim 1, further comprises a power circuit, said power circuit comprising:
    (a) a transformer, for reducing the voltage output of said generator, in the circuit;
    (b) a full wave rectifier, for converting AC output of said transformer to DC output, in the circuit;
    (c) a volt meter, for monitoring output voltage of said rectifier, in the circuit;
    (d) an ampere meter, for monitoring output current of said rectifier, in the circuit;
    (e) a main controller, for controlling the level of electric current delivered to said electric motor, in the circuit;
    (f) a hand controller, to allow manual input selection of electric current delivered to said electric motor, in the circuit;
    (g) a master switching relay network, for switching the directional actuation of said electrical motor, in the circuit;
    (h) control line relays, for sending control signals to said network, in the circuit:
    (i) a direction switch, to allow manual input for selection of directional actuation of said electric motor, in the circuit; and
    (j) a safety knife switch, to allow immediate manual disconnection of power to said electric motor, in the circuit.

3. A hovercraft motorcycle for travel over a ground surface, comprising:
    a body portion having a front end, a rear end, a longitudinal centerline extending from said rear end to said front end, and a lower surface spaced above the ground surface;
    a generally horizontal, continuous, inflatable, resilient tubular member having an air inlet port;
    an air plenum chamber defined between said tubular member, said lower surface of said body portion, and said ground surface;
    means to supply pressurized air to said air plenum chamber;
    a front wheel assembly, attached to the front end of said body portion and on the longitudinal centerline of the body portion, having a front wheel mounted thereon;
    a rear wheel assembly, attached to the rear end of said body portion and on the longitudinal centerline of the body portion, having a rear wheel mounted thereon;
    a first adjustable ballast weight attached to said front wheel assembly; and
    a second adjustable ballast weight attached to said rear wheel assembly, said first and second adjustable ballast weights to ensure that said front and rear wheel assemblies carry only enough weight of said hovercraft motorcycle to provide sufficient friction between said front and rear wheel assemblies and said surface for traction and steering purposes.

* * * * *